United States Patent
Suzuki

(10) Patent No.: US 7,832,937 B2
(45) Date of Patent: Nov. 16, 2010

(54) ROLLING BEARING APPARATUS

(75) Inventor: Kazuya Suzuki, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 991 days.

(21) Appl. No.: 11/527,621

(22) Filed: Sep. 27, 2006

(65) Prior Publication Data

US 2007/0071382 A1  Mar. 29, 2007

(30) Foreign Application Priority Data

Sep. 29, 2005  (JP) .............................. 2005-283352

(51) Int. Cl.
*F16C 19/00* (2006.01)
*F01M 11/02* (2006.01)
(52) U.S. Cl. ..................... 384/462; 384/466; 184/11.2
(58) Field of Classification Search .............. 384/93, 384/462, 465, 466, 468, 471, 473, 474, 606; 184/6.26, 11.1, 11.2, 13.1
See application file for complete search history.

(56) References Cited

U.S. PATENT DOCUMENTS 2,922,491 A * 1/1960 Macks ...................... 184/109
3,628,835 A * 12/1971 Cornish et al. .............. 384/465
4,527,661 A * 7/1985 Johnstone et al. ........... 184/6.1
7,293,919 B2 * 11/2007 Ueno et al. ................. 384/473

FOREIGN PATENT DOCUMENTS

| | | |
|---|---|---|
| EP | 0 677 672 A1 | 10/1995 |
| EP | 1 538 357 A1 | 6/2005 |
| EP | 1 811 190 A1 | 7/2007 |
| JP | 2004-108388 | 4/2004 |
| JP | 2004-316707 | 11/2004 |
| WO | WO2004/025130 | * 3/2004 |
| WO | WO 2004/025130 A1 | 3/2004 |

* cited by examiner

*Primary Examiner*—Thomas R Hannon
*Assistant Examiner*—James Pilkington
(74) *Attorney, Agent, or Firm*—Oblon, Spivak, McClelland, Maier & Neustadt, L.L.P.

(57) ABSTRACT

An oil supply unit provided in a rolling bearing apparatus has a lubricating oil discharge nozzle in which an opening is faced to a cage portion of the rolling bearing. An opening direction of the nozzle is inclined to a rotating direction with respect to a direction of a center axis of rotation.

9 Claims, 3 Drawing Sheets

(a) Prior Art

ROLLING BEARING APPARATUS

BACKGROUND OF THE INVENTION

The invention relates to a rolling bearing apparatus in which a rolling bearing is provided with an oil supply unit supplying a small amount of lubricating oil.

As the rolling bearing apparatus provided with the oil supply unit, in Japanese Unexamined Patent Publication No. 2004-108388, there is proposed one in which a fixed side raceway member of a rolling bearing is provided with an oil supply unit supplying a lubricating oil to rolling elements or a raceway surface of the raceway member as an occasion demands, and the oil supply unit is provided with a tank storing the lubricating oil, a micro pump sucking the lubricating oil within the tank so as to discharge, a nozzle arranged in a discharge port of the micro pump and having an opening facing to a portion near the rolling elements or the raceway surface of the raceway member, and a drive portion driving the micro pump.

This kind of rolling bearing apparatus is used in a machine tool or the like, however, in a case where it is used at a high speed rotation, there is a problem that a leak of the lubricating oil tends to be generated due to a negative pressure generated in a leading end portion of the nozzle, and there is further a problem that an oil drop once discharged from the nozzle moves to a root side of the nozzle and the lubricating oil cannot be supplied to a proper position.

SUMMARY OF THE INVENTION

An object of the invention is to provide a rolling bearing apparatus preventing a lubricating oil from leaking and preventing an oil drop from moving to an opposite direction, whereby the lubricating oil is securely supplied to a proper position even in a case of being used at a high speed rotation.

In accordance with the invention, there is provided a rolling bearing apparatus including: a rolling bearing provided with a fixed side raceway member, a rotating side raceway member, and a plurality of rolling elements allowing both the raceway members to relatively rotate; and an oil supply unit provided with a lubricating oil discharge nozzle having an opening facing to a portion near the rolling elements or raceway surface of the raceway member, wherein an opening direction of the nozzle is inclined in a flow direction of an air generated due to rotation.

The oil supply unit is constituted by a tank storing the lubricating oil, a pump sucking the lubricating oil within the tank so as to discharge, a lubricating oil discharge nozzle provided in a discharge port of the pump, a drive portion driving the pump, and the like.

The oil supply unit is generally attached to a fixed side (the fixed side raceway member or a housing or the like to which the fixed side raceway member is attached). In this case, "is inclined in a flow direction of an air generated due to rotation" has the same meaning as "is inclined in a rotating direction (a radial direction) with respect to a direction of a center axis of rotation (an axial direction)".

The lubricating oil discharge nozzle is, for example, positioned in a lowest portion of the rolling bearing, and is constituted by a main body extending in a horizontal direction and a discharge portion bent approximately perpendicular to the main body, and a discharge portion is directed to a flow direction of the air (the rotating direction). In this case, the direction of the discharge portion is not limited to a horizontal direction (a parallel direction to the flow direction of the air), but may be inclined downward with respect to the main body.

An angle α of the discharge portion in this case with respect to the horizontal direction is appropriately determined in a range which is equal to or more than 0 degree (including the parallel direction to the flow direction of the air) and less than 90 degree (not including the vertical direction to the flow direction of the air). In this case, it is preferable that an installed position of the lubricating oil discharge nozzle, that is, an installed position of the pump is set to a lower side of the tank, however, is not limited to the lowest portion of the rolling bearing. It is possible to prevent the lubricating oil from leaking and prevent the oil drop from moving in an opposite direction, by inclining the opening direction of the nozzle to the flow direction of the air generated due to rotation. It is preferable that a leading end portion of the nozzle is bent in the rotating direction, and it is preferable that the opening direction of the nozzle is perpendicular to the direction of the center axis of rotation.

It is necessary that the opening of the nozzle is at least positioned in an inner side in the axial direction from the end surface of the rolling bearing, and it is preferable that the opening of the nozzle is positioned in an inner side in the axial direction from an outer end surface in an axial direction of a cage.

In the oil supply unit, an entire structure thereof may be installed in the rolling bearing, a part (for example, only the pump to which the nozzle is attached or only the pump with the nozzle and the tank) of the structure may be attached to the fixed side raceway member of the rolling bearing, or the entire structure may be provided in an outer portion of the rolling bearing.

In a case where the oil supply unit is installed in the rolling bearing, the structure of the oil supply unit is attached to the fixed side raceway member of the rolling bearing or a seal ring fixed to the fixed side raceway member. In a case where the oil supply unit is provided in the outer portion of the rolling bearing, the structure of the oil supply unit is attached to a housing supporting the fixed side raceway member of the rolling bearing, a spacer fixed within the housing in adjacent to the fixed side raceway member, a lid body for closing an end portion of the housing or the like.

As the pump, for example, a diaphragm, a lubricating oil discharge nozzle and a lubricating oil suction nozzle are provided within the pump chamber, and a diaphragm type micro pump structured such that a piezoelectric element is attached to the diaphragm is suitable. The diaphragm type micro pump pulsates the diaphragm by utilizing the piezoelectric element, and discharges the lubricating oil from the lubricating oil discharge nozzle. In addition to the diaphragm type, it is possible to use various pumps such as an injection type pump, a vane pump, a screw pump, a piezo pump and the like. Further, in a case where an internal portion of the bearing comes to a negative pressure, it is possible to employ a valve turning on or off the supply of the lubricating oil to the lubricating oil discharge nozzle, in place of the pump forcedly delivering the lubricating oil.

If a length of the nozzle is too long, the pulsation of the lubricating oil generated by the pump is attenuated by the lubricating oil staying within the nozzle, and the lubricating oil is hard to be discharged. Accordingly, in a case where the pump is provided in the outer portion of the bearing, the pump is arranged near the rolling bearing. The near portion is set to a position at which the length of the nozzle is restricted to a range capable of discharging the lubricating oil based on the pulsation of the lubricating oil, and the opening of the nozzle can be faced to the portion near the rolling elements or the raceway surface of the raceway member.

Although being changed in accordance with a discharge capacity of the pump, an entire length including the bent portion (the discharge portion) of the nozzle is preferably equal to or less than 70 mm, in order to prevent the pulsation from being lost. Further, a length of the discharge portion of the nozzle is set about 5 to 60% the entire length. With regard to a diameter of the nozzle, if it is too thin, the lubricating oil is hard to be discharged, and if it is too thick, it is hard to control the discharge of the lubricating oil at a small amount. Accordingly, an inner diameter of the nozzle is preferably set between 0.1 mm and 1 mm.

The discharge amount of the lubricating oil by the pump is controlled by the drive portion. For example, very small amount of lubricating oil is discharged to the portion near the rolling elements or a raceway groove of the raceway member in a region in which the rotating speed of the rotating side raceway member is low, and in a region in which the rotating speed is high, a corresponding amount of lubricating oil thereto is discharged. As mentioned above, it is possible to continuously supply the lubricating oil to the rolling element rolling region of the rolling bearing in just proportion over a long term, and it is possible to contribute to a long-term stabilization of a rolling characteristic and an improvement of a service life.

The rolling bearing is constituted, for example, by a deep groove ball bearing, an angular contact ball bearing or the like, however, may be constituted by the other types.

The rolling bearing apparatus can be preferably used as a bearing for a spindle of a machine tool (particularly rotated at a high speed having a high rotating speed, for example, equal to or more than ten thousand) desired to supply a small amount of lubricating oil for the long term while reducing a frequency of a maintenance work. Since the lubrication of the rolling bearing apparatus can make a noise lower in comparison with the lubricating oil lubrication or the air lubrication used in the machine tool, and an amount of the discharged lubricating oil is reduced, an environmentally friendly structure is obtained. Further, since the lubrication of the rolling bearing apparatus can make a torque lower in comparison with a grease lubrication, and is suitable for a high-speed rotation, the rolling bearing apparatus can be used as a bearing apparatus of various apparatuses which cannot use the lubricating oil for the reason that a handling characteristic is inferior to the grease lubrication.

In accordance with the rolling bearing apparatus of the invention, since the opening direction of the nozzle is directed to a proper direction taking into consideration the rotating direction of the rolling bearing, it is possible to prevent the lubricating oil from leaking and prevent the oil drop from moving in the opposite direction, whereby even in a case where the apparatus is used under the high-speed rotation, it is possible to securely supply the lubricating oil to the proper position.

DETAILED DESCRIPTION OF THE PREFERRED EMBODIMENTS

A description will be given below of embodiments in accordance with the invention with reference to the accompanying drawings.

Figure 1:
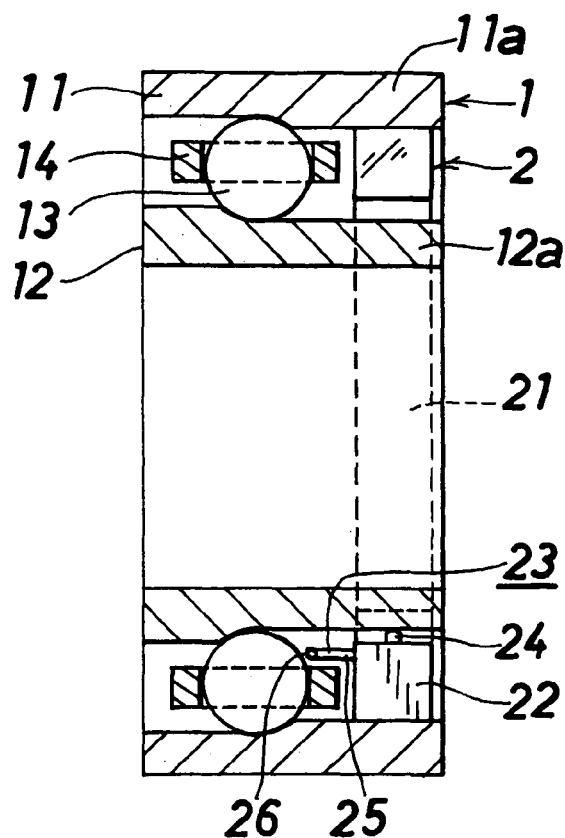
FIG. 1 is a vertical cross sectional view showing a first embodiment of a rolling bearing apparatus in accordance with the invention.
Figure 2:
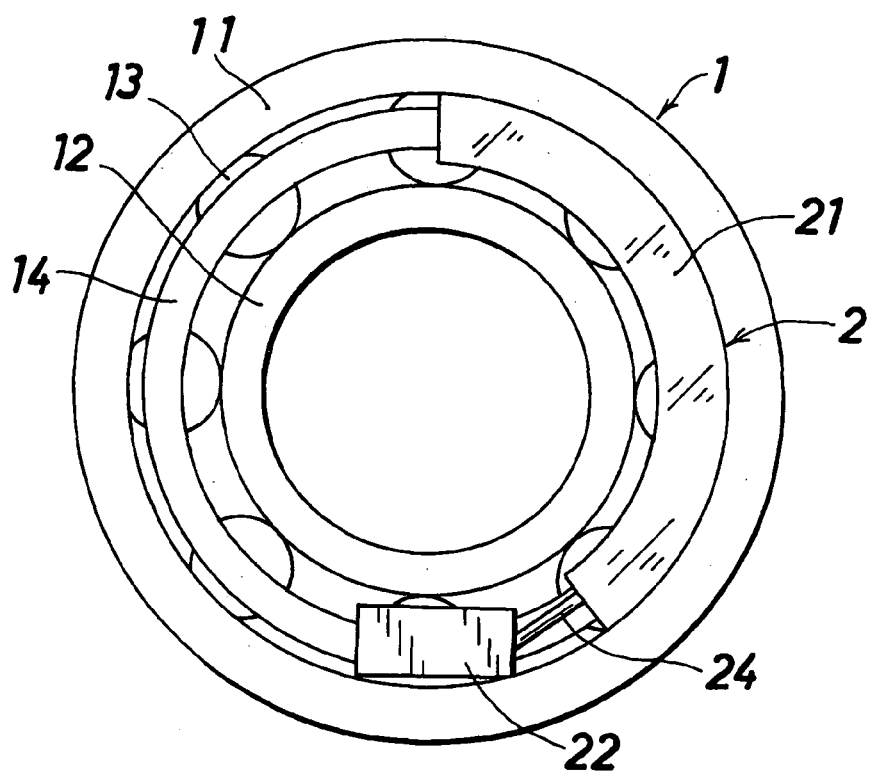
FIG. 2 is a side elevational view thereof.
Figure 3:
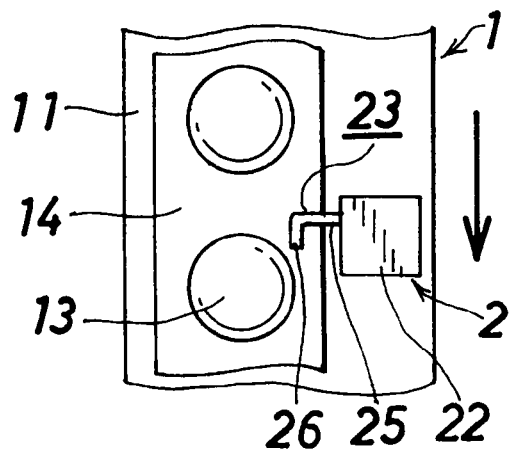
FIG. 3 is a view of a main portion of the invention as seen from an inner side in a diametrical direction.

FIGS. 1 to 3 show a first embodiment of a rolling bearing apparatus in accordance with the invention. In the following description, upper and lower mean upper and lower in FIGS. 1 and 2, and the upper and the lower coincide with upper and lower at a time when the rolling bearing is attached.

The rolling bearing apparatus in accordance with the invention is constituted by a rolling bearing 1 and an oil supply unit 2.

The rolling bearing 1 corresponds to an inner ring rotating ball bearing, and is provided with an outer ring (a fixed side raceway member) 11, an inner ring (a rotating side raceway member) 12, a plurality of balls (rolling elements) 13 allowing both the rings 11 and 12 to relatively rotate, and a cage 14 holding a plurality of balls 13.

The oil supply unit 2 is provided with a tank 21 storing a lubricating oil, a pump 22 sucking the lubricating oil within the tank 21 so as to discharge, a lubricating oil discharge nozzle 23 provided in a discharge port of the pump 22, and a drive portion (not shown) driving the pump 22.

In this embodiment, the tank 21 and the pump 22 are installed in the rolling bearing 1. Oil supply unit installing extension portions 11a and 12a are formed in the outer ring 11 and the inner ring 12, in addition to a portion for holding the balls 13, and the pump 22 is detachably mounted to a lower portion of an inner peripheral surface of the oil supply unit installing extension portion 11a of the outer ring 11. Further, the tank 21 is formed in a circular arc shape as seen from an axial direction, is detachably mounted to an inner peripheral surface of the oil supply unit installing extension portion 11a of the outer ring 11 in such a manner as to be adjacent to the pump 22 in a peripheral direction, and is connected to the pump 22 by a conduit pipe 24.

The pump 22 is structured as a diaphragm pump sucking the lubricating oil within the tank 21 into the pump chamber so as to discharge from the nozzle 23 by reciprocating a diaphragm corresponding to a driven portion by means of a piezoelectric element.

The nozzle 23 is formed as an L-shaped structure constituted by a main body 25 extending in a horizontal direction, and a discharge portion 26 bent approximately perpendicular to the main body 25. An opening of the nozzle 23, that is, a leading end of the discharge portion 26 is positioned in an inner side in an axial direction than an end surface of the rolling bearing 1, and is faced to a certain portion of the cage 14. In FIG. 3, an arrow shows a rotating direction of the inner ring 12, and an opening of the discharge portion 26 of the nozzle 23 is directed to a rotating direction.

The drive portion is provided with a power source battery (or a power generator), a pump control circuit and the like. The pump 22 is driven in accordance with a voltage signal from the drive portion, and the pump 22 sucks the lubricating oil from the tank 21, whereby the lubricating oil is discharged from the nozzle 23 to the direction of the balls 13, the raceway surface of the outer ring 11, and the raceway surface of the inner ring 12.

The lubricating oil discharge amount is set, for example, to a very small amount of lubricating oil in a region in which a rotating speed of the inner ring is low, and in a region in which the rotating speed is high, to a corresponding amount of lubricating oil. Further, the structure may be made such that a sensor is provided for detecting a lubricated state of the rolling bearing, and the discharge amount of the lubricating oil by the pump is controlled in correspondence to an output of the sensor.

If the rolling bearing 1 is rotated, a wind flow is generated due to rotation, thereby obstructing a proper supply of the lubricating oil. For example, the wind flow generated due to rotation of the rolling bearing 1 applies a similar operation to an air curtain. As a result, in a case where the nozzle is faced to an end surface of the rolling bearing, the dropped lubricating oil is prevented by the air curtain from moving to the inner side in the axial direction. This problem is solved by the opening of the nozzle 23 being faced to the certain portion of the cage 14 while passing through the air curtain.

Figure 4:
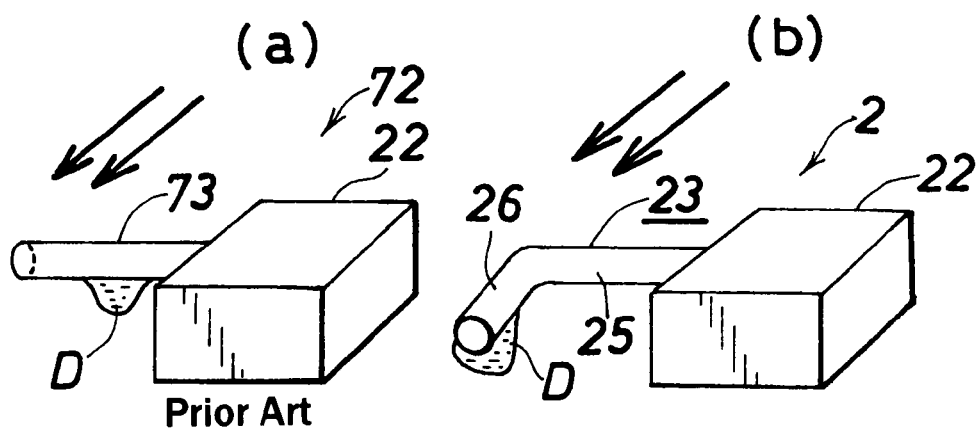
FIGS. 4(a) and 4(b) are perspective views showing a conventional oil supply unit (FIG. 4(a)) and an oil supply unit (FIG. 4(b)) of the rolling bearing apparatus in accordance with the invention in a comparing manner.
Figure 5:
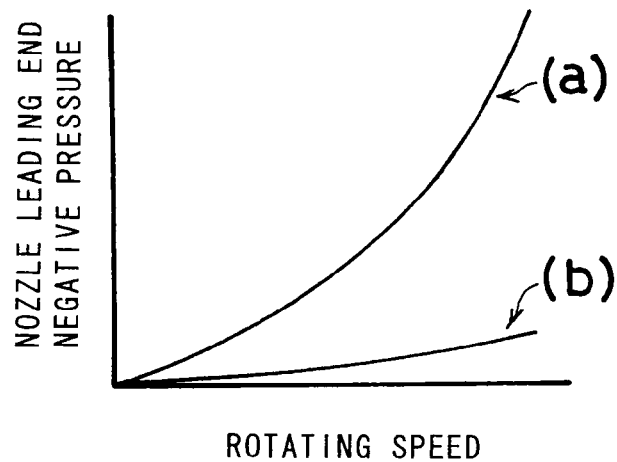
FIG. 5 is a graph comparing a magnitude of a negative pressure between the conventional oil supply unit and the oil supply unit of the rolling bearing apparatus in accordance with the invention.

However, if the nozzle is formed in a straight shape, particularly in the case of being used at a high speed rotation, there is generated a problem that the lubricating oil cannot be supplied to a proper position. FIGS. 4 and 5 are provided for comparing an oil supply unit 72 using a conventional structure (FIG. 4(a)) in which a nozzle 73 is formed in a straight shape, and an opening direction is not inclined to a rotating direction with respect to a direction of a center axis of rotation, with the oil supply unit 2 using the nozzle 23 (FIG. 4(b)) in accordance with the first embodiment mentioned above. With regard to a negative pressure in the leading ends of the nozzles 23 and 73, as shown in FIG. 5, the negative pressure is widely increased in the conventional structure (shown by reference symbol (a)) in correspondence to an increase of the rotating speed. On the contrary, in the structure (shown by reference symbol (b)) in accordance with the first embodiment, an increasing rate thereof is extremely small, and it is known that this structure is extremely useful particularly in the case of being used at a high speed rotation. Further, as shown in FIG. 4(a), in the conventional structure, there is seen a phenomenon that an oil drop D discharged from the nozzle 73 in which an axial direction is orthogonal to a rotating direction shown by an arrow moves to a root side along the nozzle 73. On the contrary, in the structure in accordance with the first embodiment mentioned above, as shown in FIG. 4(b), the axial direction of the discharge portion 26 of the nozzle 23 is oriented to the same direction as the rotating direction shown by the arrow, and the oil drop D is held in the leading end of the discharge portion 26 of the nozzle 23 by the wind generated due to rotation. As a result, it is possible to securely execute the lubrication.

As mentioned above, in accordance with the rolling bearing apparatus 1, it is possible to continuously supply the lubricating oil to the rolling region of the balls 13 in the roller bearing 2 in just proportion over the long term, and it is possible to achieve a long-term stabilization of the rolling characteristic and an improvement of a service life.

In this case, in the structure mentioned above, the rolling bearing 1 is constituted by the inner ring rotating ball bearing, however, may be constituted by the other rolling bearings than the ball bearing, or may be constituted by the outer ring rotating type. In a case where it is constituted by the outer ring rotating ball bearing, the tank 21 and the pump 22 are attached to the oil supply unit installing extension portion 12a of the inner ring 12.

In the structure in accordance with the first embodiment mentioned above, since the tank 21 and the pump 22 are installed in the rolling bearing 1 in a compact manner, they can be easily incorporated in the case of being incorporated into the main shaft or the like of the machine tool. As opposed to the first embodiment in which the tank 21 and the pump 22 of the oil supply unit 2 are installed in the rolling bearing 1, the oil supply unit 2 may be provided in an outer portion of the rolling bearing 1, as shown in FIG. 6.

Figure 6:
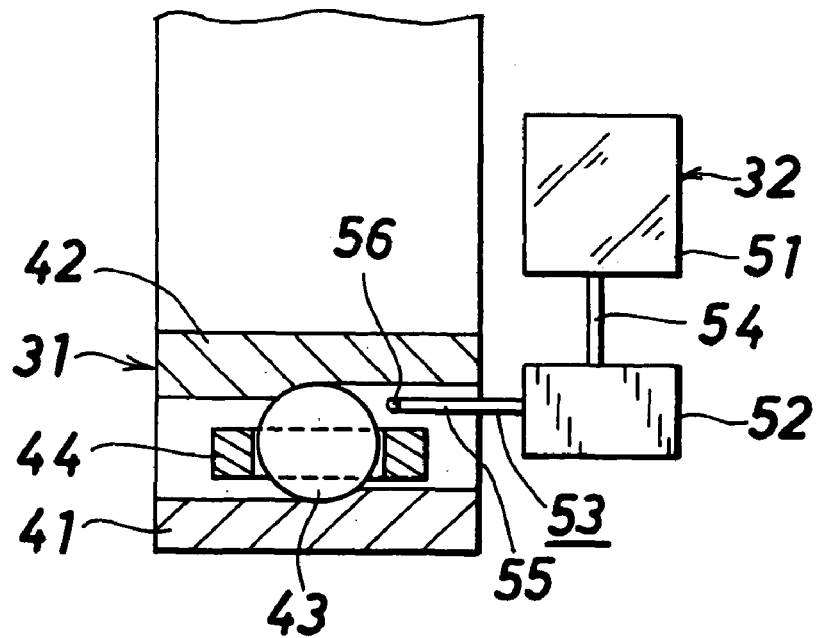
FIG. 6 is a view schematically showing a second embodiment of the rolling bearing apparatus in accordance with the invention.

In FIG. 6, a rolling bearing apparatus is constituted by a rolling bearing 31 and an oil supply unit 32. The rolling bearing 31 corresponds to an inner ring rotating ball bearing, and is provided with an outer ring (a fixed side raceway member) 41, an inner ring (a rotating side raceway member) 42, a plurality of balls (rolling elements) allowing both the rings 41 and 42 to relatively rotate, and a cage 44 holding a plurality of balls 43. The oil supply unit 32 is provided with a tank 51 storing a lubricating oil, a pump 52 sucking the lubricating oil within the tank 51 so as to discharge, a lubricating oil discharge nozzle 53 provided in a discharge port of the pump 52, a conduit pipe 54 connecting the tank 51 and the pump 52, and a drive portion (not shown) driving the pump 52.

Although an illustration is omitted, the oil supply unit 32 is attached to an appropriate position of a fixed side member such as a housing or the like to which the rolling bearing 31 is attached, including the tank 51 and the pump 52.

The nozzle 53 is formed as an L-shaped structure constituted by a main body 55 extending in a horizontal direction, and a discharge portion 56 bent approximately perpendicular to the main body 55, in the same manner as that of the first embodiment. An opening of the nozzle 53, that is, a leading end of the discharge portion 56 is positioned in an inner side in an axial direction than an end surface of the rolling bearing 31, and is faced to a certain portion of the cage 54. Accordingly, if the pump 52 sucks the lubricating oil from the tank 51, the lubricating oil is discharged from the nozzle 53 to the direction of the balls 43, the raceway surface of the outer ring 41 and the raceway surface of the inner ring 42.

Since the nozzle 53 is formed in the same shape as that of the first embodiment, it is possible to securely execute the lubrication at a time of the high speed rotation, in the second embodiment. Further, in the structure in accordance with the second embodiment, since it is not necessary to arrange the oil supply unit installing extension portions 11a and 12a in the rolling bearing 1, the rolling bearing 31 itself can employ the conventionally used rolling bearing as it is, it is not necessary to work the rolling bearing and attach the oil supply unit to the rolling bearing, and it is possible to reduce a manufacturing cost of the rolling bearing.

Figure 7:
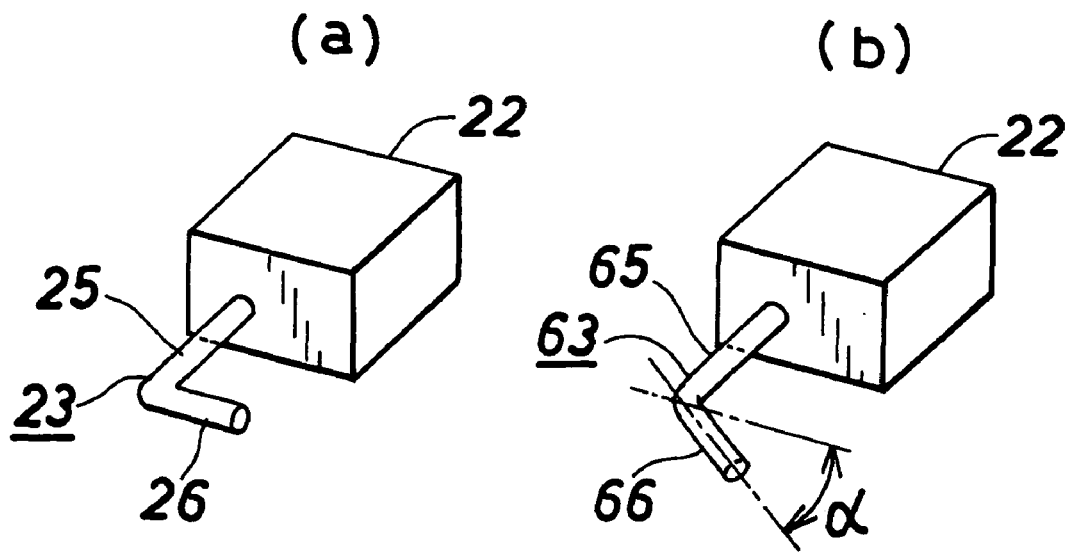
FIG. 7 is a perspective view showing another embodiment of a nozzle.

In this case, with regard to the nozzles 23 and 53 in accordance with the first and second embodiments, the discharge portions 26 and 56 are set horizontal to the horizontal nozzle main bodies 25 and 55, however, the discharge portions 26 and 56 may be inclined from the horizontal direction in a state of being oriented to the rotating direction. In other words, FIG. 7(a) shows the nozzles 23 and 53 in accordance with the respective embodiments mentioned above, however, as shown in FIG. 7(b), a discharge portion 66 may be inclined downward with respect to the horizontal direction while keeping an angle formed by a nozzle main body 65 and the discharge portion 66 at right angle (keeping the same shape of a nozzle 63). In this case, an angle α which the discharge portion 66 forms with the horizontal direction can be determined by taking a rotating speed into consideration. In the case of a relatively low speed rotation, the angle is set close to a vertical angle (a directly below angle), and in the case of a relatively high speed rotation, the angle is set close to a horizontal angle (FIG. 7(a)).

Further, the angle of the discharge portions 26, 56 and 66 with respect to the nozzle main bodies 25, 55 and 65 is not limited to the right angle, but may be set to an acute angle or an obtuse angle. Further, it is not necessary that the nozzles 23, 53 and 63 are formed in the L shape, but the nozzles 23, 53 and 63 may be formed in a straight shape in which an axis is inclined to the rotating direction with respect to the direction of the center axis of rotation (in this case, the inclined axis may be oriented to the horizontal direction, or may be inclined downward with respect to the horizontal direction). In short, the shape of the nozzle can be variously changed as far as the opening direction of the nozzle is inclined in the flowing direction of the air generated due to rotation.

What is claimed is:

1. A rolling bearing apparatus comprising:
   a rolling bearing provided with a fixed side raceway member, a rotating side raceway member, and a plurality of rolling elements allowing both the raceway members to relatively rotate about a rotation axis to generate a flow of air; and
   an oil supply unit having a lubricating oil discharge nozzle, the lubricating oil discharge nozzle provided between the raceway members, for dropping the lubricating oil, the lubricating oil discharge nozzle having an opening, the opening facing the rolling elements or facing a raceway surface of one of the raceway members,
   wherein an opening direction of the nozzle is oriented toward downstream of a flow direction of the flow of air generated due to the rotation.

2. The rolling bearing apparatus as claimed in claim 1, wherein a leading end portion of the nozzle is bent toward the rotating direction.

3. The rolling bearing apparatus as claimed in claim 2, wherein the opening direction of the nozzle is perpendicular to the axis of rotation.

4. The rolling bearing apparatus as claimed in claim 1, further comprising a cage holding the plurality of rolling elements, wherein the opening of the nozzle is positioned inwardly, in an axial direction, from an outer end portion of the cage in the axial direction.

5. The rolling bearing apparatus as claimed in claim 1, wherein the oil supply unit is provided with a tank storing a lubricating oil, and a pump sucking the lubricating oil within the tank so as to discharge the lubricating oil to the lubricating oil discharge nozzle formed in a discharge port of the pump.

6. The rolling bearing apparatus as claimed in claim 1, wherein the oil supply unit is attached to the fixed side member.

7. The rolling bearing apparatus as claimed in claim 1, wherein the lubricating oil discharge nozzle is constituted by a main body extending in a horizontal direction and a discharge portion bent approximately perpendicular to the main body.

8. The rolling bearing apparatus as claimed in claim 7, wherein an entire length including the bent portion of the nozzle is equal to or less than 70 mm, and a length of the discharge portion of the nozzle is set about 5 to 60% of the entire length.

9. The rolling bearing apparatus as claimed in claim 1, wherein the opening direction of the lubricating oil discharge nozzle is parallel to the flow direction of the flow of air at the location of the opening of the oil discharge nozzle.

* * * * *